US012737934B2

(12) United States Patent
Borse et al.

(10) Patent No.: US 12,737,934 B2
(45) Date of Patent: Sep. 15, 2026

(54) HARDWARE-AWARE EFFICIENT ARCHITECTURES FOR TEXT-TO-IMAGE DIFFUSION MODELS

(71) Applicant: QUALCOMM Incorporated, San Diego, CA (US)

(72) Inventors: Shubhankar Mangesh Borse, San Diego, CA (US); Risheek Garrepalli, San Diego, CA (US); Qiqi Hou, San Diego, CA (US); Jisoo Jeong, San Diego, CA (US); Shreya Kadambi, San Diego, CA (US); Munawar Hayat, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 18/492,572

(22) Filed: Oct. 23, 2023

(65) Prior Publication Data

US 2025/0131606 A1 Apr. 24, 2025

(51) Int. Cl.
*G06T 11/00* (2026.01)
*G06T 3/4046* (2024.01)

(52) U.S. Cl.
CPC ............ *G06T 11/00* (2013.01); *G06T 3/4046* (2013.01)

(58) Field of Classification Search
CPC .............................. G06T 11/00; G06T 3/4046
See application file for complete search history.

(56) References Cited

U.S. PATENT DOCUMENTS 11,763,087 B2 * 9/2023 Borchmann .......... G06F 40/295 345/629
11,995,803 B1 * 5/2024 Karpman .................. G06T 5/70
12,211,180 B1 * 1/2025 Degtiarev ................. G06T 5/60
2020/0034702 A1 * 1/2020 Fukuda ................ G06N 3/0442
2022/0156502 A1 * 5/2022 Filtenborg ............. G06F 40/30
2023/0351185 A1 * 11/2023 Guo ........................ G06N 3/082
2023/0394285 A1 * 12/2023 Korviakov ............. G06N 3/045
2024/0281924 A1 * 8/2024 Park ...................... G06T 3/4046

(Continued)

OTHER PUBLICATIONS

International Search Report and Written Opinion—PCT/US2024/045211—ISA/EPO—Dec. 23, 2024.

(Continued)

*Primary Examiner* — Kevin Ky
(74) *Attorney, Agent, or Firm* — Seyfarth Shaw LLP

(57) ABSTRACT

A processor-implemented method includes receiving a text-semantic input at a first stage of a neural network, including a first convolutional block and no attention layers. The method receives, at a second stage, a first output from the first stage. The second stage comprises a first down sampling block including a first attention layer and a second convolutional block. The method receives, at a third stage, a second output from the second stage. The third stage comprises a first up sampling block including a second attention layer and a first set of convolutional blocks. The method receives, at a fourth stage, the first output from the first stage and a third output from the third stage. The fourth stage comprises a second up sampling block including no attention layers and a second set of convolutional blocks. The method generates an image at the fourth stage, based on the text-semantic input.

24 Claims, 9 Drawing Sheets

(56) References Cited

U.S. PATENT DOCUMENTS

| | | | | |
|---|---|---|---|---|
| 2024/0386249 | A1* | 11/2024 | Harvey .................... | G06N 7/01 |
| 2025/0285265 | A1* | 9/2025 | Chartrand ............. | G06T 7/0012 |
| 2025/0315651 | A1* | 10/2025 | Letourneau ............ | G06N 3/045 |

OTHER PUBLICATIONS

Li Y., et al., "SnapFusion: Text-to-Image Diffusion Model on Mobile Devices Within Two Seconds", arXiv:2306.00980v3 [cs. CV], Arxiv.Org, Cornell University Library, 201 Olin Library Cornell University Ithaca, NY, 14853, Oct. 16, 2023, pp. 1-17.
Meng C., et al., "On Distillation of Guided Diffusion Models", arXiv:2210.03142v3 [cs.CV], arXiv.org, Cornell University Library, 201 Olin Library Cornell University Ithaca, NY, 14853, Apr. 12, 2023, 36 Pages.
Salimans T., et al., "Progressive Distillation for Fast Sampling of Diffusion Models", Published as a conference paper at ICLR 2022, arXiv: 2202.00512v2 [cs.LG], Arxiv.Org, Cornell University Library, 201 Olin Library Cornell University Ithaca, NY 14853, Jun. 7, 2022, pp. 1-21.
Zhao W., et al., "Unleashing Text-to-Image Diffusion Models for Visual Perception", 2023 IEEE/CVF International Conference on Computer Vision (ICCV), IEEE, Oct. 1, 2023, pp. 5706-5716.

* cited by examiner

HARDWARE-AWARE EFFICIENT ARCHITECTURES FOR TEXT-TO-IMAGE DIFFUSION MODELS

FIELD OF THE DISCLOSURE

Aspects of the present disclosure generally relate to machine learning, and more specifically to hardware-aware efficient architectures for text-to-image diffusion models.

BACKGROUND

Artificial neural networks may comprise interconnected groups of artificial neurons (e.g., neuron models). The artificial neural network (ANN) may be a computational device or be represented as a method to be performed by a computational device. Convolutional neural networks (CNNs) are a type of feed-forward ANN. Convolutional neural networks may include collections of neurons that each have a receptive field and that collectively tile an input space. Convolutional neural networks, such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Diffusion models are generative models designed to transform easily generated data into more complex and realistic data through a sequence of invertible transformations. For example, a diffusion model may generate an image from a text prompt. Diffusion models may employ CNNs and also attention layers, which may help with memorizing large sequences by focusing attention to specific portions of data. Due to the complex computations specified by CNNs and attention layers of diffusion models, diffusion models demand substantial computational power, resulting in tradeoffs between training time and the quality of generated data.

SUMMARY

Aspects of the present disclosure are directed to an apparatus. The apparatus has one or more memory and one or more processors coupled to the one or more memory. The processor(s) is configured to receive a text-semantic input at a first stage of a neural network. The first stage includes a first convolutional block and no attention layers. The processor(s) is also configured to receive, at a second stage, a first output from the first stage. The second stage comprises a first down sampling block including a first attention layer and a second convolutional block. The processor(s) is further configured to receive, at a third stage, a second output from the second stage. The third stage comprises a first up sampling block including a second attention layer and a first set of convolutional blocks. The processor(s) is still further configured to receive, at a fourth stage, the first output from the first stage and a third output from the third stage. The fourth stage comprises a second up sampling block including no attention layers and a second set of convolutional blocks. The processor(s) is also configured to generate an image at the fourth stage, based on the text-semantic input.

In other aspects of the present disclosure, a method includes receiving a text-semantic input at a first stage of a neural network. The first stage includes a first convolutional block and no attention layers. The method also includes receiving, at a second stage, a first output from the first stage. The second stage comprises a first down sampling block including a first attention layer and a second convolutional block. The method further includes receiving, at a third stage, a second output from the second stage. The third stage comprises a first up sampling block including a second attention layer and a first set of convolutional blocks. The method still further includes receiving, at a fourth stage, the first output from the first stage and a third output from the third stage. The fourth stage comprises a second up sampling block including no attention layers and a second set of convolutional blocks. The method also includes generating an image at the fourth stage, based on the text-semantic input.

In other aspects of the present disclosure, a non-transitory computer-readable medium with program code recorded thereon is disclosed. The program code is executed by a processor and includes program code to receive a text-semantic input at a first stage of a neural network. The first stage includes a first convolutional block and no attention layers. The program code also includes program code to receive, at a second stage, a first output from the first stage. The second stage comprises a first down sampling block including a first attention layer and a second convolutional block. The program code further includes program code to receive, at a third stage, a second output from the second stage. The third stage comprises a first up sampling block including a second attention layer and a first set of convolutional blocks. The program code still further includes program code to receive, at a fourth stage, the first output from the first stage and a third output from the third stage. The fourth stage comprises a second up sampling block including no attention layers and a second set of convolutional blocks. The program code also further includes program code to generate an image at the fourth stage, based on the text-semantic input.

Other aspects of the present disclosure are directed to an apparatus. The apparatus includes means for receiving a text-semantic input at a first stage of a neural network. The first stage includes a first convolutional block and no attention layers. The apparatus also includes means for receiving, at a second stage, a first output from the first stage. The second stage comprises a first down sampling block including a first attention layer and a second convolutional block. The apparatus further includes means for receiving, at a third stage, a second output from the second stage. The third stage comprises a first up sampling block including a second attention layer and a first set of convolutional blocks. The apparatus still further includes means for receiving, at a fourth stage, the first output from the first stage and a third output from the third stage. The fourth stage comprises a second up sampling block including no attention layers and a second set of convolutional blocks. The apparatus also includes means for generating an image at the fourth stage, based on the text-semantic input.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
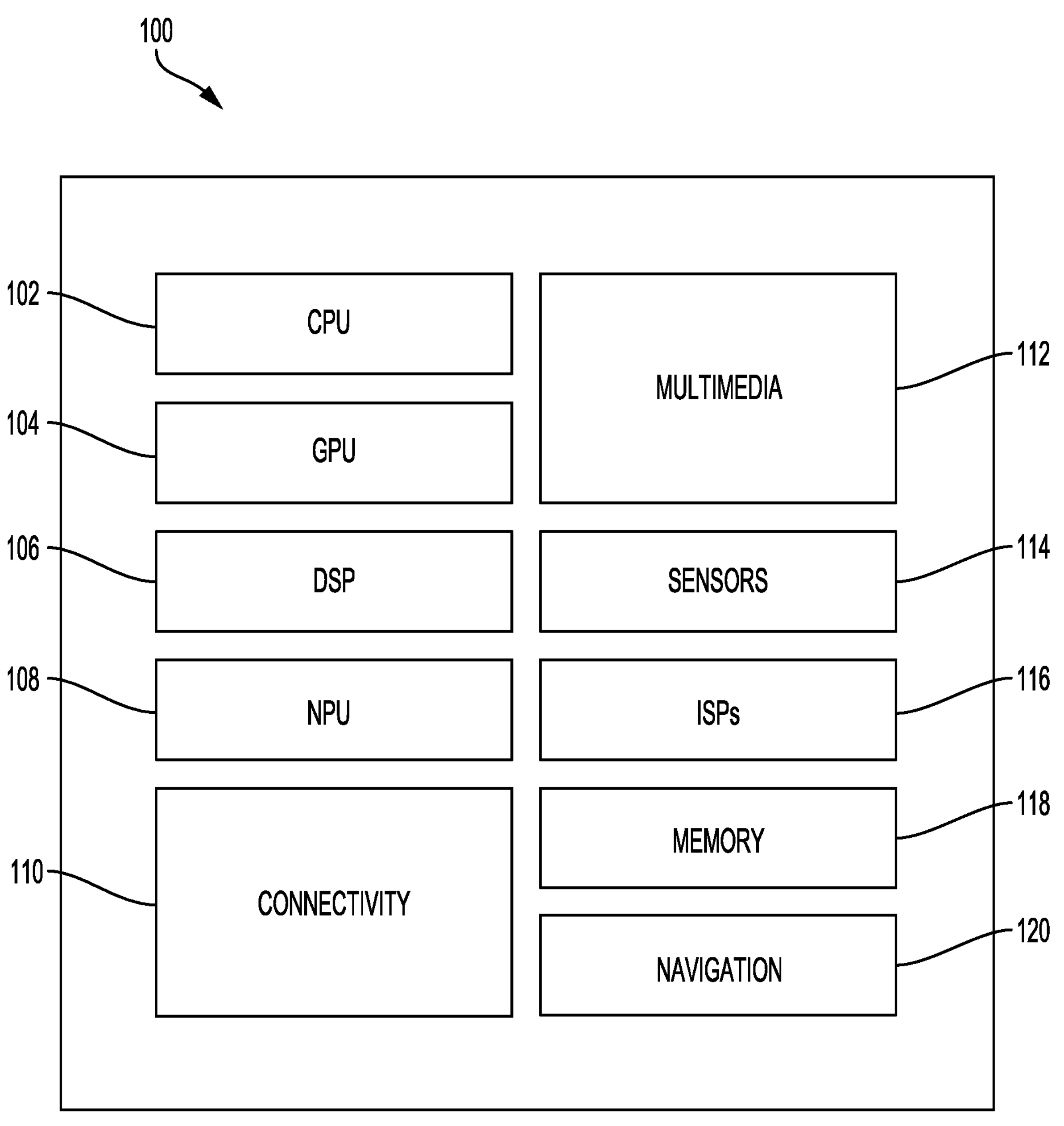
FIG. 1 illustrates an example implementation of a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word “exemplary” is used to mean “serving as an example, instance, or illustration.” Any aspect described as “exemplary” is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Diffusion models are generative models designed to transform easily generated data into more complex and realistic data through a sequence of invertible transformations. For example, a diffusion model may generate an image from a text prompt. Diffusion models demand substantial computational power, resulting in tradeoffs between training time and the quality of generated data.

Diffusion models may employ a UNet architecture, which is so named because of the u-shape of the network, including a down sampling path and an up sampling path. UNet architectures in current state-of-the-art (SOTA) models adopt a combination of attention layers and convolutional layers at each stage of the UNet. Current UNet architectures adopt global self-attention and cross-attention operations at all spatial resolutions. Attention operations consume significant compute and memory resources making edge device inference challenging and on-device generative artificial intelligence (AI) inference challenging.

Aspects of the present disclosure introduce hardware efficient architectures for machine learning diffusion-based generative models. In some aspects, the hardware efficient architectures are efficient UNet architectures. According to aspects of the present disclosure, a convolution only block is adopted for a first stage of a UNet. Consequently, cross-attention is not adopted to process text or image information for low-level features at the first stage having the highest resolution of the network. Because high resolution blocks mostly recover low-level details, global self-attention is not adopted in these blocks with the highest resolution (e.g., the first stage of the architecture.)

Two variants of efficient architectures with minimal attention layers are introduced. In both architectures, text semantics are injected only for 32×32 and lower spatial resolutions. That is, a convolution only block is provided for the first stage of the UNet architecture. In the first variant, two convolution blocks are provided in the down sampling portion of the network and three convolution blocks are provided in the up sampling portion. The second variant builds on top of the first variant architecture, and further adopts one fewer block of convolution per stage.

Particular aspects of the subject matter described in this disclosure can be implemented to realize one or more of the following potential advantages. In some examples, the described techniques with an efficient architecture may reduce diffusion model latency while maintaining high performance.

FIG. 1 illustrates an example implementation of a system-on-a-chip (SOC) 100, which may include a central processing unit (CPU) 102 or a multi-core CPU configured for text-to-image diffusion models. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In aspects of the present disclosure, the instructions loaded into the general-purpose processor 102 may include code to receive a text-semantic input at a first stage of a neural network, the first stage including a first convolutional block and no attention layers. The general-purpose processor 102 may also include code to receive, at a second stage, a first output from the first stage, the second stage comprising a first down sampling block including a first attention layer and a second convolutional block. The general-purpose processor 102 may include code to receive, at a third stage, a second output from the second stage, the third stage comprising a first up sampling block including a second attention layer and a first set of convolutional blocks. The general-purpose processor 102 may also include code to receive, at a fourth stage, the first output from the first stage and a third output from the third stage, the fourth stage comprising a second up sampling block including no attention layers and a second set of convolutional blocks. The general-purpose processor 102 may further include code to generate an image at the fourth stage, based on the text-semantic input. In some aspects, the general-purpose processor 102 may include means for receiving, means for generating, and means for training.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
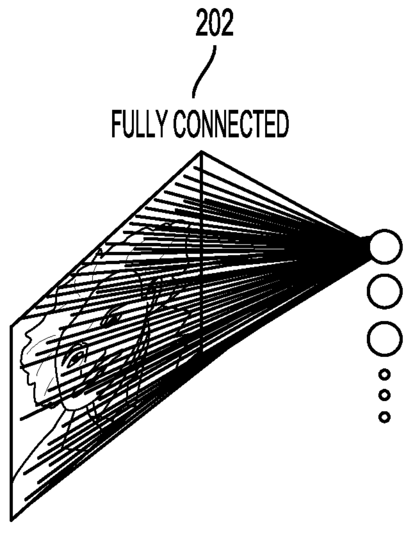
FIGS. 2A, 2B, and 2C are diagrams illustrating a neural network, in accordance with various aspects of the present disclosure.
Figure 2B:
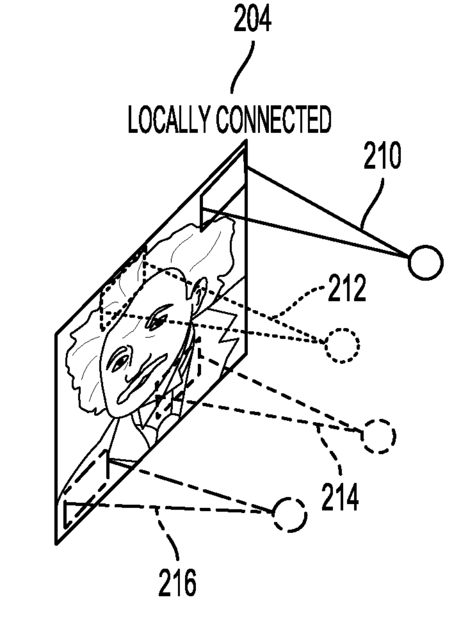

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
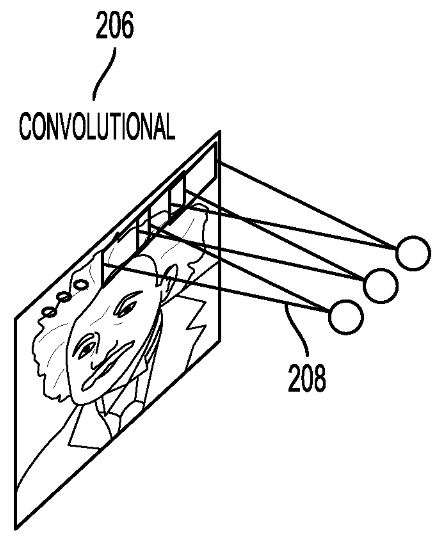

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
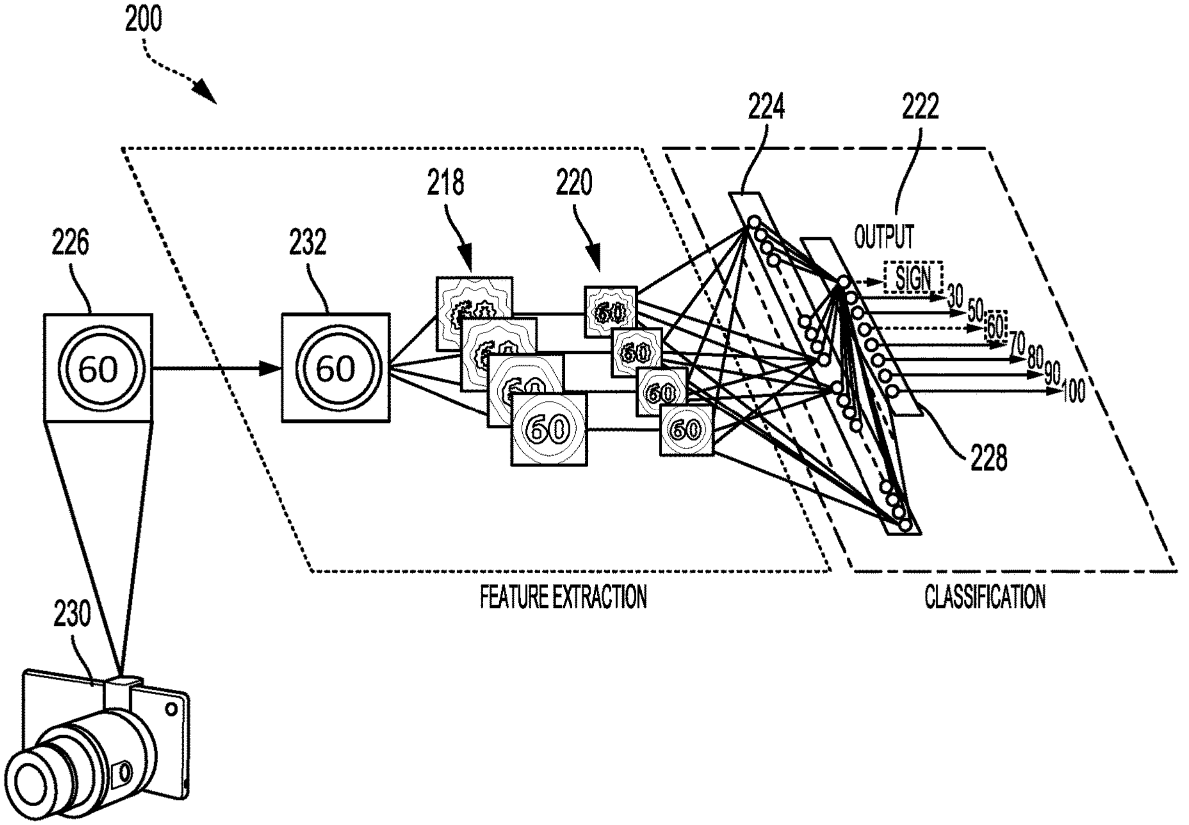
FIG. 2D is a diagram illustrating an exemplary deep convolutional network (DCN), in accordance various with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images (e.g., the speed limit sign of the image 226) and a forward pass through the DCN 200 may yield an output 222 that may be considered an inference or a prediction of the DCN 200.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3:
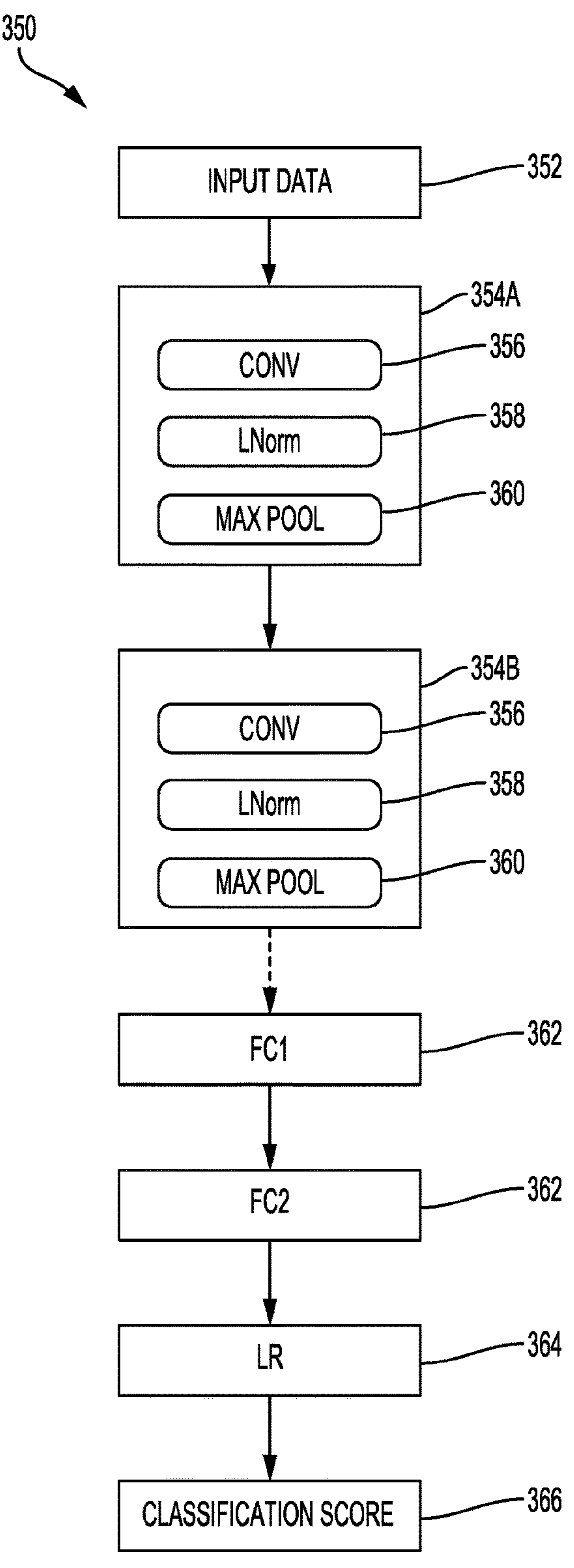
FIG. 3 is a block diagram illustrating an exemplary deep convolutional network (DCN), in accordance with various aspects of the present disclosure.

FIG. 3 is a block diagram illustrating a DCN 350. The DCN 350 may include multiple different types of layers based on connectivity and weight sharing. As shown in FIG. 3, the DCN 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

Although only two of the convolution blocks 354A, 354B are shown, the present disclosure is not so limiting, and instead, any number of the convolution blocks 354A, 354B may be included in the DCN 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 (e.g., FIG. 1) to achieve high performance and low power consumption. In alternative embodiments, the parallel filter banks may be loaded on the DSP 106 or an ISP 116 of an SOC 100. In addition, the DCN 350 may access other processing blocks that may be present on the SOC 100, such as sensor processor 114 and navigation module 120, dedicated, respectively, to sensors and navigation.

The DCN 350 may also include one or more fully connected layers 362 (FC1 and FC2). The DCN 350 may further include a logistic regression (LR) layer 364. Between each layer 356, 358, 360, 362, 364 of the DCN 350 are weights (not shown) that are to be updated. The output of each of the layers (e.g., 356, 358, 360, 362, 364) may serve as an input of a succeeding one of the layers (e.g., 356, 358, 360, 362, 364) in the DCN 350 to learn hierarchical feature representations from input data 352 (e.g., images, audio, video, sensor data and/or other input data) supplied at the first of the convolution blocks 354A. The output of the DCN 350 is a classification score 366 for the input data 352. The classification score 366 may be a set of probabilities, where each probability is the probability of the input data including a feature from a set of features.

Figure 4:
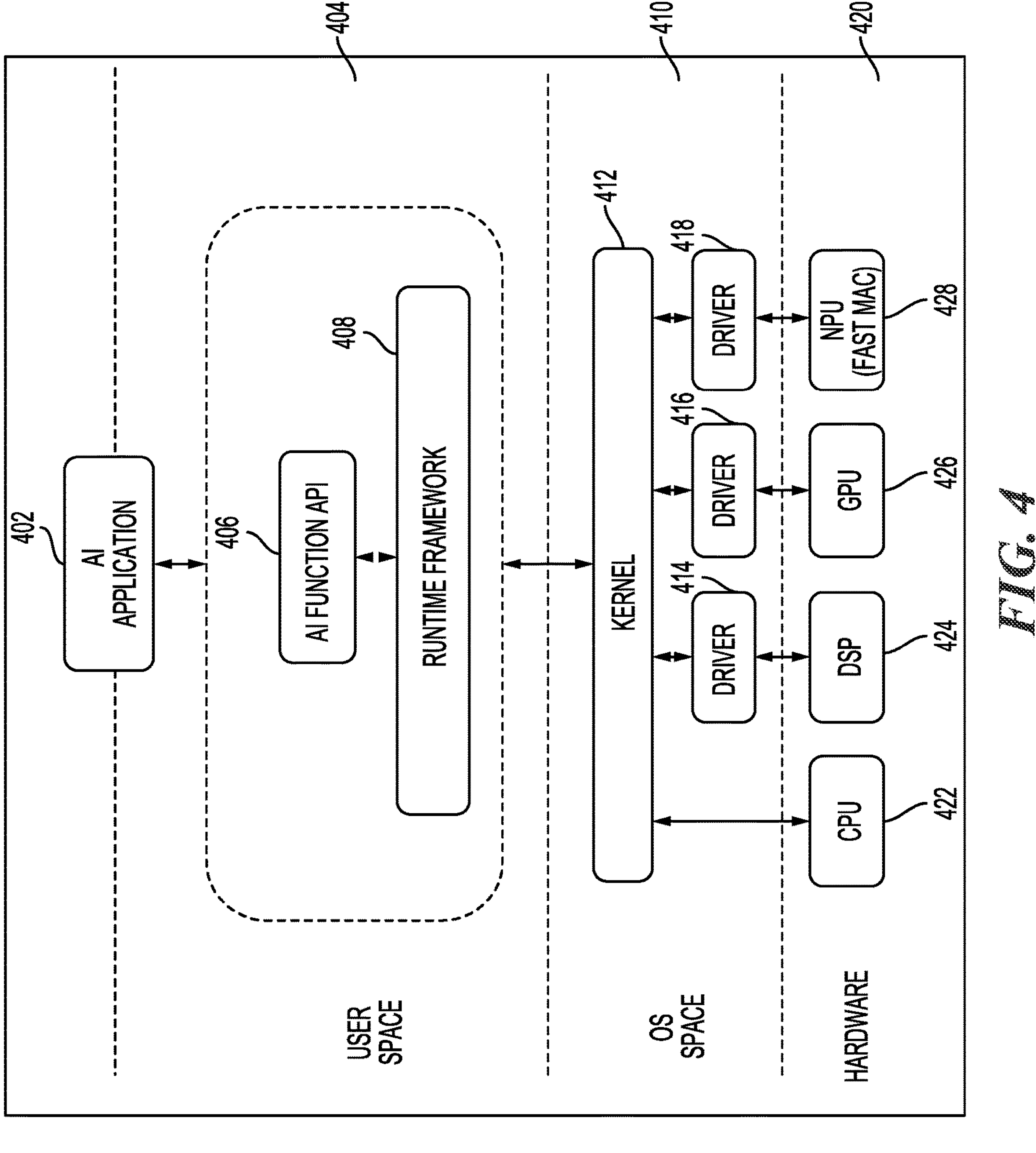
FIG. 4 is a block diagram illustrating an exemplary software architecture that may modularize artificial intelligence (AI) functions, in accordance with various aspects of the present disclosure.

FIG. 4 is a block diagram illustrating an exemplary software architecture 400 that may modularize artificial intelligence (AI) functions. Using the architecture 400, applications may be designed that may cause various processing blocks of an SOC 420 (for example a CPU 422, a DSP 424, a GPU 426 and/or an NPU 428) (which may be similar to SOC 100 of FIG. 1) to receive a text-semantic input at a first stage of a neural network, the first stage including a first convolutional block and no attention layers for an AI application 402, according to aspects of the present disclosure. The architecture 400 may, for example, be included in a computational device, such as a smartphone.

Using the architecture 400, applications may be designed that may cause various processing blocks of an SOC 420 (for example a CPU 422, a DSP 424, a GPU 426 and/or an NPU 428) (which may be similar to SOC 100 of FIG. 1) to receive, at a second stage, a first output from the first stage, the second stage comprising a first down sampling block including a first attention layer and a second convolutional block for an AI application 402, according to aspects of the present disclosure. The architecture 400 may, for example, be included in a computational device, such as a smartphone.

Using the architecture 400, applications may be designed that may cause various processing blocks of an SOC 420 (for example a CPU 422, a DSP 424, a GPU 426 and/or an NPU 428) (which may be similar to SOC 100 of FIG. 1) to receive, at a third stage, a second output from the second stage, the third stage comprising a first up sampling block including a second attention layer and a first set of convolutional blocks for an AI application 402, according to aspects of the present disclosure. The architecture 400 may, for example, be included in a computational device, such as a smartphone.

Using the architecture 400, applications may be designed that may cause various processing blocks of an SOC 420 (for example a CPU 422, a DSP 424, a GPU 426 and/or an NPU 428) (which may be similar to SOC 100 of FIG. 1) to receive, at a fourth stage, the first output from the first stage and a third output from the third stage, the fourth stage comprising a second up sampling block including no attention layers and a second set of convolutional blocks for an AI application 402, according to aspects of the present disclosure. The architecture 400 may, for example, be included in a computational device, such as a smartphone.

Using the architecture 400, applications may be designed that may cause various processing blocks of an SOC 420 (for example a CPU 422, a DSP 424, a GPU 426 and/or an NPU 428) (which may be similar to SOC 100 of FIG. 1) to generate an image at the fourth stage, based on the text-semantic input for an AI application 402, according to aspects of the present disclosure. The architecture 400 may, for example, be included in a computational device, such as a smartphone.

The AI application 402 may be configured to call functions defined in a user space 404 that may, for example, provide for the detection and recognition of a scene indicative of the location at which the computational device including the architecture 400 currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

The run-time engine 408, which may be compiled code of a runtime framework, may be further accessible to the AI application 402. The AI application 402 may cause the run-time engine 408, for example, to request an inference at a particular time interval or triggered by an event detected by the user interface of the AI application 402. When caused to provide an inference response, the run-time engine 408 may in turn send a signal to an operating system in an operating system (OS) space 410, such as a Kernel 412, running on the SOC 420. In some examples, the Kernel 412 may be a LINUX Kernel. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

Diffusion is the process of particles, information, or energy moving from an area of higher concentration to an area of lower concentration. In machine learning and data generation, diffusion refers to an approach employed by diffusion models, which are generative models designed to transform easily generated data into more complex and realistic data through a sequence of invertible transformations. During the diffusion process, the diffusion model starts with a simple distribution, for example, a Gaussian distribution, and gradually transforms the data into a desired complex data distribution, thus facilitating tasks like image synthesis and denoising. Diffusion models demand substantial computational power, resulting in tradeoffs between training time and the quality of generated data.

Examples of tasks performed by diffusion models include text-to-image generation, as well as image or video editing. Solutions from a diffusion model may be used for cameras (e.g., video cameras), and personal computing for image or video generation and editing. Diffusion models may also efficiently generate synthetic image data for training deep learning models, may be used for autonomous driving, as well as for extended reality (XR), augmented reality (AR), and virtual reality (VR) applications.

Diffusion-based generative models, for example, Stable Diffusion developed by STABILITY AI, ImageGen developed by GOOGLE, VideoLDM developed by NVIDIA and FireFly developed by ADOBE are computationally expensive. For example, iterative denoising requires multiple forward passes of a neural network for each generation. The neural network may be a UNet architecture, which is so named because of the u-shape of the network, including a down sampling path and an up sampling path.

UNet architectures in current state-of-the-art (SOTA) models, for example, Stable Diffusion and variants, adopt a combination of attention layers and convolutional layers at each stage of the UNet. Current UNet architectures adopt global self-attention and cross-attention operations at all spatial resolutions. Global attention at high resolution is computationally expensive. For example, each global attention operation at a 64×64 resolution specifies a peak memory of 256 MB (4096×4096). Attention operations consume significant compute and memory resources, making edge device inference challenging and on-device generative artificial intelligence (AI) inference challenging. For example, the softmax activation function specifies matrix multiplication operations on large matrices, such as a 4096×4096 matrix for 64×64 cross-attention blocks. Thus, the softmax function is a significant bottleneck, especially for large tensors, taking 50% of available cycles in some cases.

Aspects of the present disclosure introduce hardware efficient architectures for machine learning diffusion-based generative models. In some aspects, the hardware efficient architectures are efficient UNet architectures.

Assuming an input of 512×512, a highest resolution of a first stage of the architecture is a 64×64 resolution that primarily focuses on low-level details. According to aspects of the present disclosure, a convolution only block is adopted for a first stage of a UNet. Consequently, cross-attention is not adopted to process text or image information for low-level features at the first stage having the highest resolution of the network. Because high resolution blocks mostly recover low-level details, global self-attention is not adopted in these blocks with the highest resolution (e.g., the first stage of the architecture.) This idea is further supported by the fact that much of the text and spatial-semantic interaction is captured in low resolution stages of the architecture, where more channels and capacity are available in diffusion-based generative models. The architectures of the present disclosure are two to three times faster on-device than existing architectures.

Two variants of efficient architectures with minimal attention layers are now described, with each architecture retaining high performance. In both architectures, text semantics are injected only for 32×32 and lower spatial resolutions. That is, a convolution only block is provided for the first stage of the UNet architecture.

Figure 5:
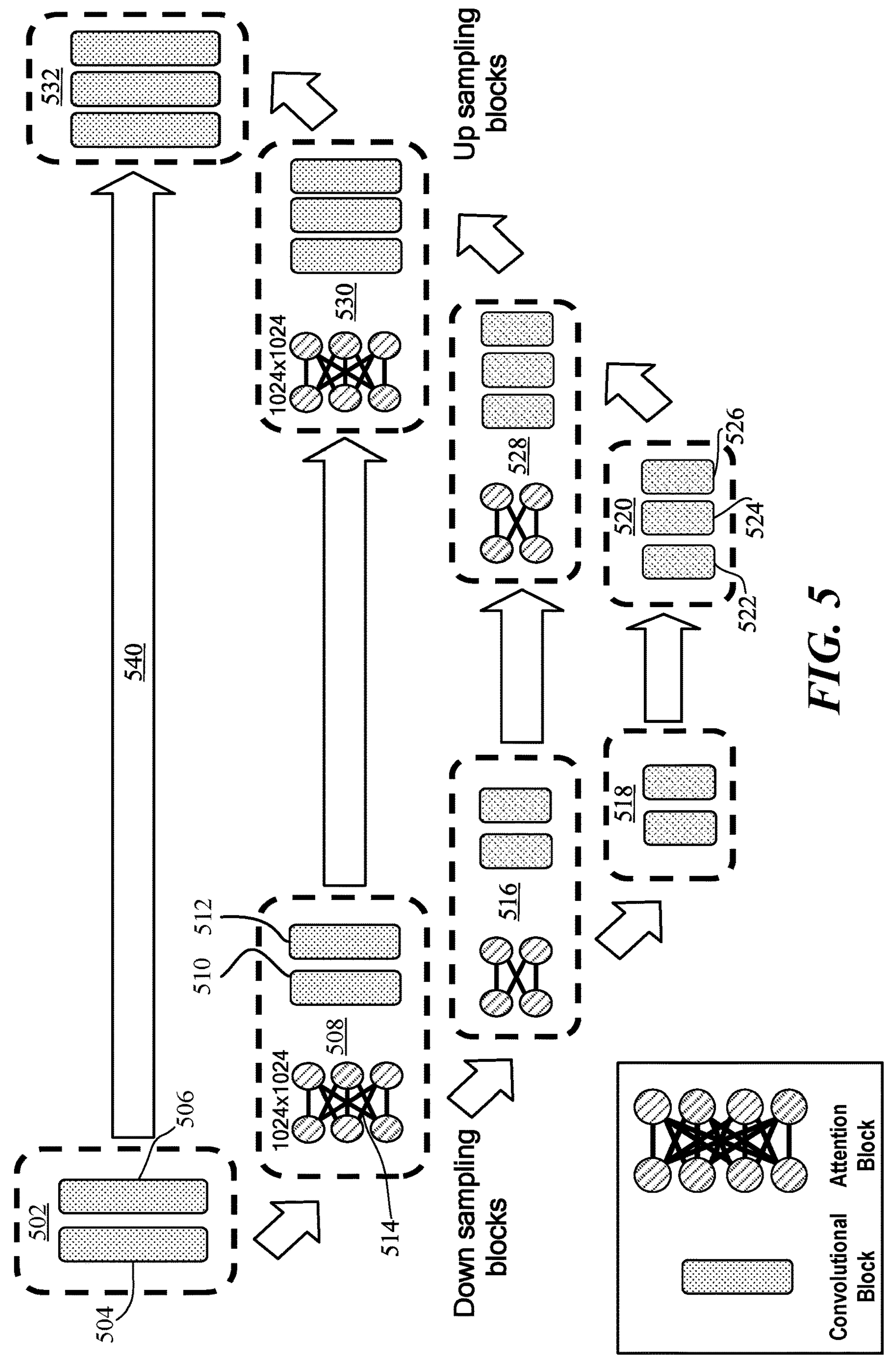
FIG. 5 is a block diagram illustrating a first variant of an efficient architecture for diffusion-based generative models, in accordance with various aspects of the present disclosure.

FIG. 5 is a block diagram illustrating a first variant of an efficient architecture for diffusion-based generative models, in accordance with various aspects of the present disclosure. The architecture shown in FIG. 5 is an example of a UNet with four down stages and four up stages. It is noted that the architecture is not limited to any particular number of stages. The present disclosure and the accompanying claims contemplates any number of stages. In the architecture shown in FIG. 5, a first stage 502 receives a text-semantic input. In the example of FIG. 5, the first stage 502 is a 64×64 input stage, although the present disclosure is not limited to any such resolution. The first stage 502 includes two convolutional blocks 504, 506. The first stage 502 does not include any self-attention or cross-attention layers. A second stage 508 has a lower resolution than the first stage 502 for down sampling the feature map generated at the first stage 502. For example, the second stage 508 may have a 32×32 resolution. The second stage 508 includes two convolutional blocks 510, 512, and also attention layers 514. For example, the attention layers 514 may be a 1024×1024 self-attention and/or cross-attention layer. The attention layers 514 inject the text-semantic input into the second stage 508.

A third stage 516 may also include two convolutional blocks and attention layers (not separately labeled). The third stage 516 and the attention layers of the third stage 516 have lower resolutions than the second stage 508. For example, the third stage 516 may have a 16×16 spatial resolution and the attention layers in the third stage 516 may be 256×256. A fourth stage 518, also referred to as a midblock, includes two convolutional blocks (not separately labeled) and no attention layers. The fourth stage 518 may have a spatial resolution of 8×8. The second, third, and fourth stages 508, 516, 518 may be referred to as down sampling stages or down sampling blocks of the network architecture.

Up sampling stages (or up sampling blocks) of the architecture include a fifth, sixth, and seventh stage 520, 528, 530 in the example of FIG. 5. The fifth stage 520 may also be referred to as a midblock and includes three convolutional blocks 522, 524, 526. A spatial resolution of the fifth stage 520 may be 8×8. The sixth stage 528 includes three convolutional blocks and an attention layer (not separately labeled). Similarly, the seventh stage 530 includes three convolutional blocks and an attention layer (not separately labeled). The sixth and seventh stages 528, 530 may have respective resolutions of 16×16, and 32×32. An eighth stage 532 is an output layer and includes three convolutional blocks (not separately labeled) and no attention layers. Thus, it can be seen that attention is only provided in stages having a resolution of 32×32 or lower. Each stage, with two blocks of convolutional, self-attention and cross-attention per stage, offers good capacity to retain information and case optimization.

Not only does each stage receive input from an immediately preceding stage, but each up sampling stage also receives input from a corresponding stage on the down sampling side via a skip connection. For example, the output stage, e.g., the eighth stage 532, receives input from both the first stage 502 (via a skip connection 540) and also from the seventh stage 530. It is noted that the second midblock (e.g., fifth stage 520) receives input from the fourth stage 518 without any additional input. The efficient architecture shown in FIG. 5 reduces on-device latency, with little impact on generation quality, compared with a baseline model.

Figure 6:
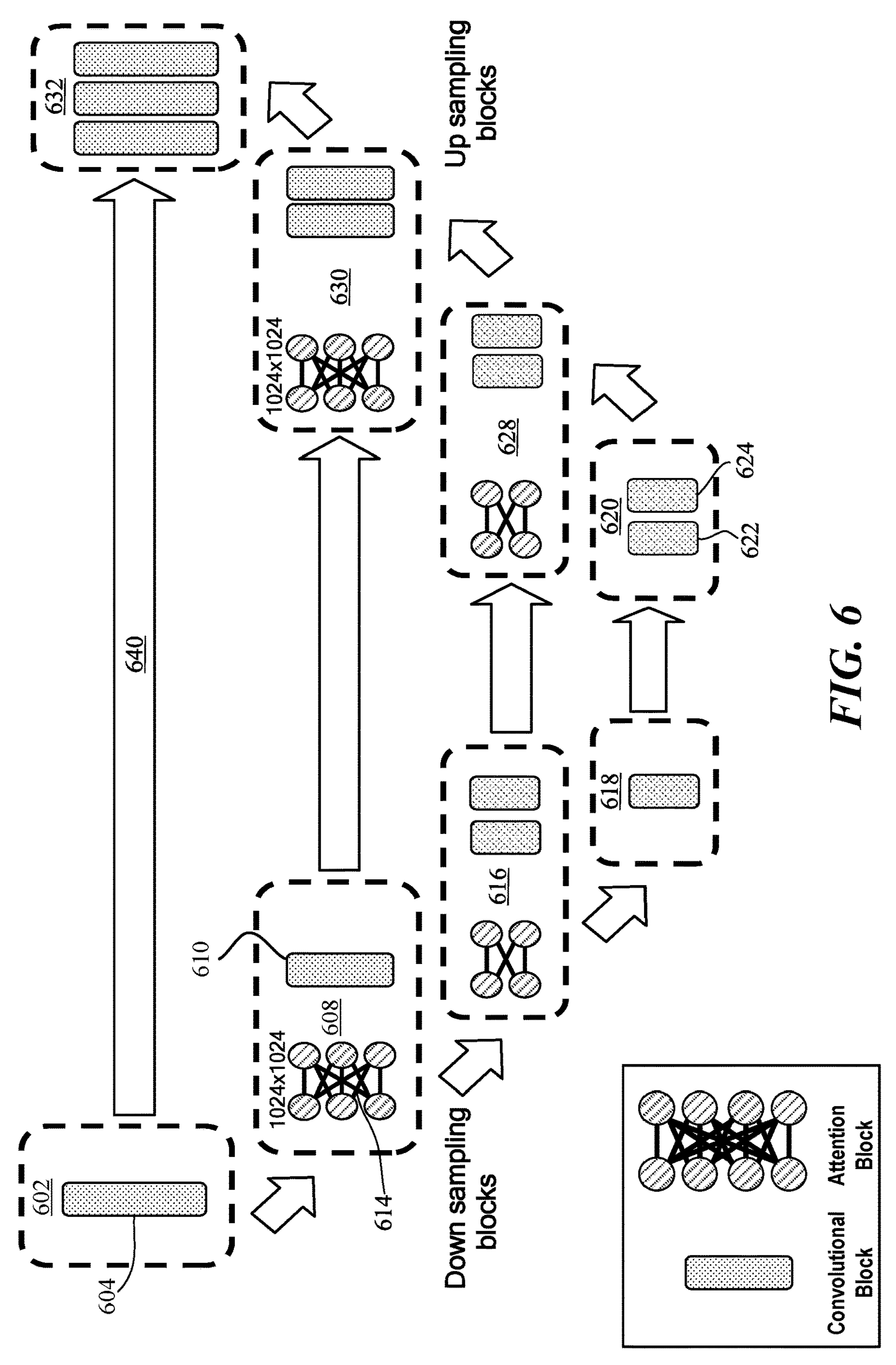
FIG. 6 is a block diagram illustrating a second variant of an efficient architecture for diffusion-based generative models, in accordance with various aspects of the present disclosure.

FIG. 6 is a block diagram illustrating a second variant of an efficient architecture for diffusion-based generative models, in accordance with various aspects of the present disclosure. The second variant shown in FIG. 6 builds on top of the architecture shown in FIG. 5, and may be referred to as a pruned version of variation one. The second variant adopts one fewer block of convolution, self-attention and cross-attention per down sampling stage (excluding the input stage). In the architecture shown in FIG. 6, a first stage 602 receives a text-semantic input. In the example of FIG. 6, the first stage 602 is a 64×64 input stage, although the present disclosure is not limited to any such resolution. The first stage 602 includes one convolutional block 604. The first stage 602 does not include any self-attention or cross-attention layers. A second stage 608 has a lower resolution than the first stage 602 for down sampling the feature map of the first stage 602. For example, the second stage 608 may have a 32×32 resolution. The second stage 608 includes one convolutional block 610, and also attention layers 614. For example, the attention layers 614 may be a 1024×1024 self-attention and/or cross-attention layer. The attention layers 614 inject the text-semantic input into the second stage 608.

A third stage 616 may also include one convolutional block and attention layers (not separately labeled). The third stage 616 and the attention layers of the third stage 616 have lower resolutions than the second stage 608. For example, the third stage 616 may have a 16×16 spatial resolution and the attention layers in the third stage 616 may be 256×256. A fourth stage 618, also referred to as a midblock, includes one convolutional block (not separately labeled) and no attention layers. The fourth stage 618 may have a spatial resolution of 8×8. The second, third, and fourth stages 608, 616, 618 may be referred to as down sampling stages or down sampling blocks of the network architecture.

Up sampling stages (or up sampling blocks) of the architecture include a fifth, sixth, and seventh stage 620, 628, 630 in the example of FIG. 6. The fifth stage 620 may also be referred to as a midblock and includes two convolutional blocks 622, 624. A spatial resolution of the fifth stage 620 may be 8×8. The sixth stage 628 includes two convolutional blocks and attention layers (not separately labeled). Similarly, the seventh stage 630 includes two convolutional blocks and attention layers (not separately labeled). The sixth and seventh stages 628, 630 may have respective resolutions of 16×16, and 32×32. An eighth stage 632 is an output layer and includes two convolutional blocks (not separately labeled) and no attention layers. Thus, it can be seen that attention is only provided in stages having a resolution of 32×32 or lower.

Not only does each stage receive input from an immediately preceding stage, but each up sampling stage also receives input from a corresponding stage on the down sampling side via a skip connection. For example, the output stage, e.g., the eighth stage 632, receives input from both the first stage 602 (via a skip connection 640) and also from the seventh stage 630. It is noted that the second midblock (e.g., fifth stage 620) receives input from the fourth stage 618 without any additional input. The efficient architecture shown in FIG. 6 reduces on-device latency, with little impact on generation quality, compared with a baseline model and also compared with the first variant shown in FIG. 5. For example, although some features may be dropped with variant two, the result is similar and is calculated more quickly than with variant one.

It is difficult, however, to obtain the high performance second variant model due to optimization challenges. A two-step objective eases network convergence. Block-wise distillation is a technique for obtaining the variant two architecture from the variant one architecture. Block-wise distillation employs a strong curvature-aware regularization with layer-wise distillation. During the optimization to obtain the variant one model, skip connections and additional capacity help to obtain a smoother loss-landscape towards a good solution. Once a solution or checkpoint (e.g., the variant one model) is determined, a good local optima is found. Additional capacity can be pruned from the variant one model to create a more efficient model (e.g., variant two) around the local optima. Block-wise distillation is successful because two stage optimization is curvature-aware and a good initialization for the second stage is obtained. That is, a more challenging optimization problem is first solved with a model (e.g., variant one) having higher capacity for numerical stability and convergence. Once the good local optima is obtained, a local search can be solved instead of a global search with limited capacity, the global search meaning a transition from a baseline model to variant two without first training the variant one architecture. According to aspects of the present disclosure, variant two may be trained on variant one to more easily obtain the variant two model. Strong regularization results from a layer-wise objective (e.g., block-wise distillation) for a local search.

Figure 7:
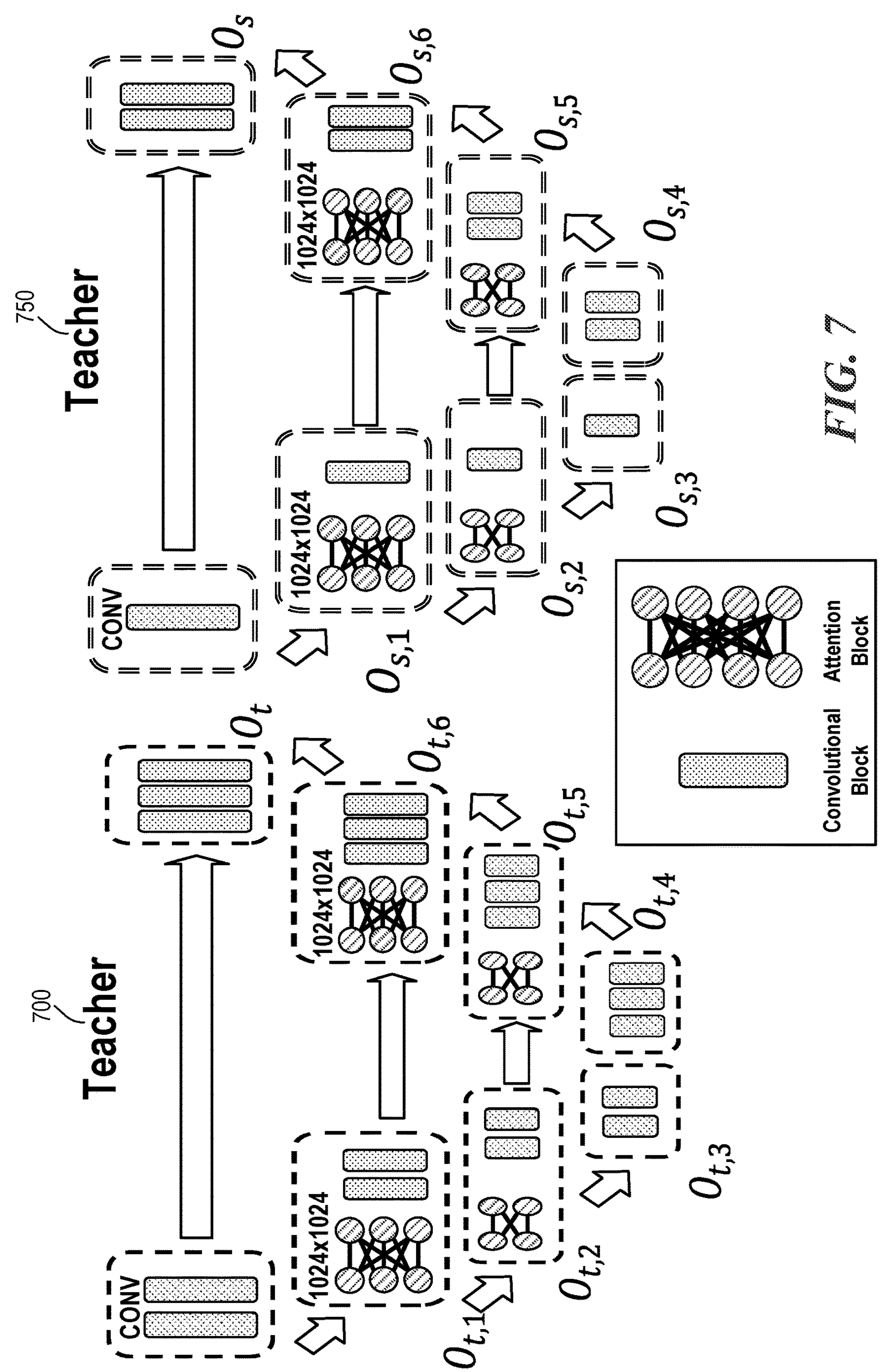
FIG. 7 is a block diagram illustrating block-wise distillation for diffusion-based generative models, in accordance with various aspects of the present disclosure.

FIG. 7 is a block diagram illustrating block-wise distillation for diffusion-based generative models, in accordance with various aspects of the present disclosure. In the example of FIG. 7, a teacher architecture 700 corresponds to the variant one architecture shown in FIG. 5. A student architecture 750 corresponds to the variant two architecture shown in FIG. 6. Block-wise distillation may be calculated based on the following equation:

$$\text{Loss}_{total} = \lambda_{out}\|O_t - O_s\|^2 + \sum_{i=1}^{6}\lambda_i\|O_{t,i} - O_{s,i}\|,^2$$

where $\lambda_{out}$ is a hyper parameter indicating how much weight is given to each calculation, $O_t$ represents the output from the teacher architecture 700, $O_s$ represents the output from the student architecture. $\|x\|$ represents the norm of x, $O_{t,\ i}$ represents the output from the teacher architecture 700 at layer i, and $O_{s,\ i}$ represents the output from the student architecture 750 at layer i. The $\text{Loss}_{total}$ may be used as the objective for training the student architecture 750.

Figure 8:
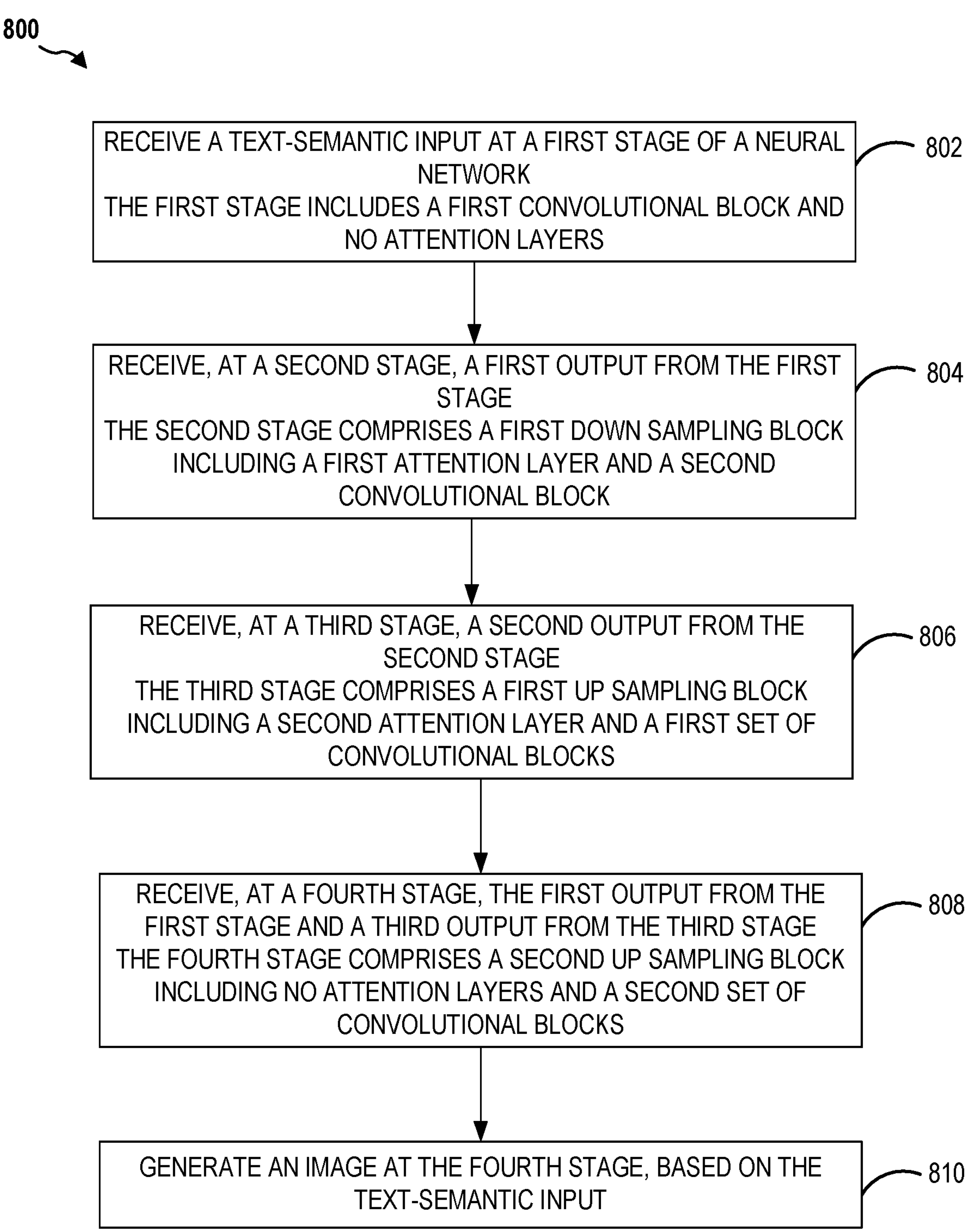
FIG. 8 is a flow diagram illustrating a process for generating an image with an efficient diffusion model architecture, in accordance with various aspects of the present disclosure.

FIG. 8 is a flow diagram illustrating a process 800 for generating an image with an efficient diffusion model architecture, in accordance with various aspects of the present disclosure. As shown in FIG. 8, in some aspects, the process 800 may receive a text-semantic input at a first stage of a neural network. The first stage includes a first convolutional block and no attention layers (block 802). In some aspects, the neural network comprises a text-to-image diffusion-based generative model. In some aspects, the neural network comprises a UNet.

In some aspects, the process 800 may receive, at a second stage, a first output from the first stage. The second stage comprises a first down sampling block including a first attention layer and a second convolutional block (block 804). In some aspects, the process 800 may receive, at a third stage, a second output from the second stage. The third stage comprises a first up sampling block including a second attention layer and a first set of convolutional blocks (block 806). In some aspects, the process 800 may receive, at a fourth stage, the first output from the first stage and a third output from the third stage. The fourth stage comprises a second up sampling block including no attention layers and a second set of convolutional blocks (block 808). In some aspects, the first stage comprises a first additional convolutional block, the second stage comprises a second additional convolutional block, the third stage comprises a third additional convolutional block, and the fourth stage comprises a fourth additional convolutional block.

In some aspects, the process 800 may generate an image at the fourth stage, based on the text-semantic input (block 810). The process may further include training the neural network to obtain a converged neural network; and training a pruned neural network based on the converged neural network. The converged neural network may comprise a teacher neural network and the pruned neural network may comprise a student neural network, in which case the process also includes training the student neural network based on a block-wise error calculation for each stage of the student neural network relative to a same stage of the teacher neural network.

EXAMPLE ASPECTS

Aspect 1: An apparatus, comprising: at least one memory; and at least one processor coupled to the at least one memory, the at least one processor configured to: receive a text-semantic input at a first stage of a neural network, the first stage including a first convolutional block and no attention layers; receive, at a second stage, a first output from the first stage, the second stage comprising a first down sampling block including a first attention layer and a second convolutional block; receive, at a third stage, a second output from the second stage, the third stage comprising a first up sampling block including a second attention layer and a first set of convolutional blocks; receive, at a fourth stage, the first output from the first stage and a third output from the third stage, the fourth stage comprising a second up sampling block including no attention layers and a second set of convolutional blocks; and generate an image at the fourth stage, based on the text-semantic input.

Aspect 2: The apparatus of Aspect 1, in which the neural network comprises a text-to-image diffusion-based generative model.

Aspect 3: The apparatus of Aspect 1, in which the neural network comprises a UNet.

Aspect 4: The apparatus of any of the preceding Aspects, in which the first stage comprises a first additional convolutional block, the second stage comprises a second additional convolutional block, the third stage comprises a third additional convolutional block, and the fourth stage comprises a fourth additional convolutional block.

Aspect 5: The apparatus of any of the preceding Aspects, in which the at least one processor is further configured to: train the neural network to obtain a converged neural network; and train a pruned neural network based on the converged neural network.

Aspect 6: The apparatus of any of the preceding Aspects, in which the converged neural network comprises a teacher neural network and the pruned neural network comprises a student neural network, the at least one processor is further configured to train the student neural network based on a block-wise error calculation for each stage of the student neural network relative to a same stage of the teacher neural network.

Aspect 7: A method, comprising: receiving a text-semantic input at a first stage of a neural network, the first stage including a first convolutional block and no attention layers; receiving, at a second stage, a first output from the first stage, the second stage comprising a first down sampling block including a first attention layer and a second convolutional block; receiving, at a third stage, a second output from the second stage, the third stage comprising a first up sampling block including a second attention layer and a first set of convolutional blocks; receiving, at a fourth stage, the first output from the first stage and a third output from the third stage, the fourth stage comprising a second up sampling block including no attention layers and a second set of convolutional blocks; and generating an image at the fourth stage, based on the text-semantic input.

Aspect 8: The method of Aspect 7, in which the neural network comprises a text-to-image diffusion-based generative model.

Aspect 9: The method of Aspect 7, in which the neural network comprises a UNet.

Aspect 10: The method of any of the Aspects 7-9, in which the first stage comprises a first additional convolutional block, the second stage comprises a second additional convolutional block, the third stage comprises a third additional convolutional block, and the fourth stage comprises a fourth additional convolutional block.

Aspect 11: The method of any of the Aspects 7-10, further comprising: training the neural network to obtain a converged neural network; and training a pruned neural network based on the converged neural network.

Aspect 12: The method of any of the Aspects 7-11, in which the converged neural network comprises a teacher neural network and the pruned neural network comprises a student neural network, the method further comprising training the student neural network based on a block-wise error calculation for each stage of the student neural network relative to a same stage of the teacher neural network.

Aspect 13: A non-transitory computer-readable medium having program code recorded thereon, the program code executed by a processor and comprising: program code to receive a text-semantic input at a first stage of a neural network, the first stage including a first convolutional block and no attention layers; program code to receive, at a second stage, a first output from the first stage, the second stage comprising a first down sampling block including a first attention layer and a second convolutional block; program code to receive, at a third stage, a second output from the second stage, the third stage comprising a first up sampling block including a second attention layer and a first set of convolutional blocks; program code to receive, at a fourth stage, the first output from the first stage and a third output from the third stage, the fourth stage comprising a second up sampling block including no attention layers and a second set of convolutional blocks; and program code to generate an image at the fourth stage, based on the text-semantic input.

Aspect 14: The non-transitory computer-readable medium of Aspect 13, in which the neural network comprises a text-to-image diffusion-based generative model.

Aspect 15: The non-transitory computer-readable medium of Aspect 13, in which the neural network comprises a UNet.

Aspect 16: The non-transitory computer-readable medium of any of the Aspects 13-15, in which the first stage comprises a first additional convolutional block, the second stage comprises a second additional convolutional block, the third stage comprises a third additional convolutional block, and the fourth stage comprises a fourth additional convolutional block.

Aspect 17: The non-transitory computer-readable medium of any of the Aspects 13-16, in which the program code comprises: program code to train the neural network to obtain a converged neural network; and program code to train a pruned neural network based on the converged neural network.

Aspect 18: The non-transitory computer-readable medium of any of the Aspects 13-17, in which the converged neural network comprises a teacher neural network and the pruned neural network comprises a student neural network, the program code comprises program code to train the student neural network based on a block-wise error calculation for each stage of the student neural network relative to a same stage of the teacher neural network.

Aspect 19: An apparatus, comprising: means for receiving a text-semantic input at a first stage of a neural network, the first stage including a first convolutional block and no attention layers; means for receiving, at a second stage, a first output from the first stage, the second stage comprising a first down sampling block including a first attention layer and a second convolutional block; means for receiving, at a third stage, a second output from the second stage, the third stage comprising a first up sampling block including a second attention layer and a first set of convolutional blocks; means for receiving, at a fourth stage, the first output from the first stage and a third output from the third stage, the fourth stage comprising a second up sampling block including no attention layers and a second set of convolutional blocks; and means for generating an image at the fourth stage, based on the text-semantic input.

Aspect 20: The apparatus of Aspect 19, in which the neural network comprises a text-to-image diffusion-based generative model.

Aspect 21: The apparatus of Aspect 19, in which the neural network comprises a UNet.

Aspect 22: The apparatus of any of the Aspects 19-21, in which the first stage comprises a first additional convolutional block, the second stage comprises a second additional convolutional block, the third stage comprises a third additional convolutional block, and the fourth stage comprises a fourth additional convolutional block.

Aspect 23: The apparatus of any of the Aspects 19-22, further comprising: means for training the neural network to obtain a converged neural network; and means for training a pruned neural network based on the converged neural network.

Aspect 24: The apparatus of any of the Aspects 19-23, in which the converged neural network comprises a teacher neural network and the pruned neural network comprises a student neural network, the apparatus further comprising means to train the student neural network based on a block-wise error calculation for each stage of the student neural network relative to a same stage of the teacher neural network.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/ or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. An apparatus, comprising:

at least one memory; and at least one processor coupled to the at least one memory, the at least one processor configured to:

receive a text-semantic input at a first stage of a neural network, the first stage operating at a first spatial resolution and including a first convolutional block and no attention layers;

generate a first output comprising a feature map at the first stage;

receive, at a second stage, the first output from the first stage, the second stage operating at a second spatial resolution lower than the first spatial resolution and comprising a first down sampling block including a first attention layer and a second convolutional block, wherein the text-semantic input is injected at the second stage but not the first stage;

receive, at a third stage, a second output from the second stage, the third stage comprising a first up sampling block including a second attention layer and a first set of convolutional blocks;

receive, at a fourth stage, the first output from the first stage and a third output from the third stage, the fourth stage operating at the first spatial resolution and comprising a second up sampling block including no attention layers and a second set of convolutional blocks; and generate an image at the fourth stage, based on the text-semantic input.

2. The apparatus of claim 1, in which the neural network comprises a text-to-image diffusion-based generative model.

3. The apparatus of claim 1, in which the neural network comprises a UNet.

4. The apparatus of claim 1, in which the first stage comprises a first additional convolutional block, the second stage comprises a second additional convolutional block, the third stage comprises a third additional convolutional block, and the fourth stage comprises a fourth additional convolutional block.

5. The apparatus of claim 4, in which the at least one processor is further configured to:

train the neural network to obtain a converged neural network; and train a pruned neural network based on the converged neural network.

6. The apparatus of claim 5, in which the converged neural network comprises a teacher neural network and the pruned neural network comprises a student neural network, the at least one processor is further configured to train the student neural network based on a block-wise error calculation for each stage of the student neural network relative to a same stage of the teacher neural network.

7. A processor-implemented method, comprising:

receiving a text-semantic input at a first stage of a neural network, the first stage operating at a first spatial resolution and including a first convolutional block and no attention layers;

generating a first output comprising a feature map at the first stage;

receiving, at a second stage, the first output from the first stage, the second stage operating at a second spatial resolution lower than the first spatial resolution and comprising a first down sampling block including a first attention layer and a second convolutional block, wherein the text-semantic input is injected at the second stage but not the first stage;

receiving, at a third stage, a second output from the second stage, the third stage comprising a first up sampling block including a second attention layer and a first set of convolutional blocks;

receiving, at a fourth stage, the first output from the first stage and a third output from the third stage, the fourth stage operating at the first spatial resolution and comprising a second up sampling block including no attention layers and a second set of convolutional blocks; and generating an image at the fourth stage, based on the text-semantic input.

8. The method of claim 7, in which the neural network comprises a text-to-image diffusion-based generative model.

9. The method of claim 7, in which the neural network comprises a UNet.

10. The method of claim 7, in which the first stage comprises a first additional convolutional block, the second stage comprises a second additional convolutional block, the third stage comprises a third additional convolutional block, and the fourth stage comprises a fourth additional convolutional block.

11. The method of claim 10, further comprising:

training the neural network to obtain a converged neural network; and training a pruned neural network based on the converged neural network.

12. The method of claim 11, in which the converged neural network comprises a teacher neural network and the pruned neural network comprises a student neural network, the method further comprising training the student neural network based on a block-wise error calculation for each stage of the student neural network relative to a same stage of the teacher neural network.

13. A non-transitory computer-readable medium having program code recorded thereon, the program code executed by a processor and comprising:

program code to receive a text-semantic input at a first stage of a neural network, the first stage operating at a first spatial resolution and including a first convolutional block and no attention layers;

program code to generate a first output comprising a feature map at the first stage;

program code to receive, at a second stage, the first output from the first stage, the second stage operating at a second spatial resolution lower than the first spatial resolution and comprising a first down sampling block including a first attention layer and a second convolutional block, wherein the text-semantic input is injected at the second stage but not the first stage;

program code to receive, at a third stage, a second output from the second stage, the third stage comprising a first up sampling block including a second attention layer and a first set of convolutional blocks;

program code to receive, at a fourth stage, the first output from the first stage and a third output from the third stage, the fourth stage operating at the first spatial resolution and comprising a second up sampling block including no attention layers and a second set of convolutional blocks; and program code to generate an image at the fourth stage, based on the text-semantic input.

14. The non-transitory computer-readable medium of claim 13, in which the neural network comprises a text-to-image diffusion-based generative model.

15. The non-transitory computer-readable medium of claim 13, in which the neural network comprises a UNet.

16. The non-transitory computer-readable medium of claim 13, in which the first stage comprises a first additional convolutional block, the second stage comprises a second additional convolutional block, the third stage comprises a third additional convolutional block, and the fourth stage comprises a fourth additional convolutional block.

17. The non-transitory computer-readable medium of claim 16, in which the program code further comprises:

program code to train the neural network to obtain a converged neural network; and program code to train a pruned neural network based on the converged neural network.

18. The non-transitory computer-readable medium of claim 17, in which the converged neural network comprises a teacher neural network and the pruned neural network comprises a student neural network, the program code further comprises program code to train the student neural network based on a block-wise error calculation for each stage of the student neural network relative to a same stage of the teacher neural network.

19. An apparatus, comprising:

means for receiving a text-semantic input at a first stage of a neural network, the first stage operating at a first spatial resolution and including a first convolutional block and no attention layers;

means for generating a first output comprising a feature map at the first stage;

means for receiving, at a second stage, the first output from the first stage, the second stage operating at a second spatial resolution lower than the first spatial resolution and comprising a first down sampling block including a first attention layer and a second convolutional block, wherein the text-semantic input is injected at the second stage but not the first stage;

means for receiving, at a third stage, a second output from the second stage, the third stage comprising a first up sampling block including a second attention layer and a first set of convolutional blocks;

means for receiving, at a fourth stage, the first output from the first stage and a third output from the third stage, the fourth stage operating at the first spatial resolution and comprising a second up sampling block including no attention layers and a second set of convolutional blocks; and means for generating an image at the fourth stage, based on the text-semantic input.

20. The apparatus of claim 19, in which the neural network comprises a text-to-image diffusion-based generative model.

21. The apparatus of claim 19, in which the neural network comprises a UNet.

22. The apparatus of claim 19, in which the first stage comprises a first additional convolutional block, the second stage comprises a second additional convolutional block, the third stage comprises a third additional convolutional block, and the fourth stage comprises a fourth additional convolutional block.

23. The apparatus of claim 22, further comprising:

means for training the neural network to obtain a converged neural network; and means for training a pruned neural network based on the converged neural network.

24. The apparatus of claim 23, in which the converged neural network comprises a teacher neural network and the pruned neural network comprises a student neural network, the apparatus further comprising means to train the student neural network based on a block-wise error calculation for each stage of the student neural network relative to a same stage of the teacher neural network.

* * * * *